United States Patent
Rockwell

(10) Patent No.: US 11,387,620 B2
(45) Date of Patent: Jul. 12, 2022

(54) COMPACT RAMAN LASER CAPABLE OF EFFICIENT OPERATION AT LOW PEAK POWERS WITH GOOD BEAM QUALITY

(71) Applicant: Raytheon Company, Waltham, MA (US)

(72) Inventor: David A. Rockwell, Culver City, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/951,860

(22) Filed: Nov. 18, 2020

(65) Prior Publication Data
US 2022/0158406 A1    May 19, 2022

(51) Int. Cl.
*H01S 3/30* (2006.01)
*H01S 3/08* (2006.01)
(Continued)

(52) U.S. Cl.
CPC ............ *H01S 3/08068* (2013.01); *H01S 3/07* (2013.01); *H01S 3/094038* (2013.01);
(Continued)

(58) Field of Classification Search
CPC .. H01S 3/08068; H01S 3/07; H01S 3/094038; H01S 3/094042; H01S 3/094061; H01S 3/30
See application file for complete search history.

(56) References Cited

U.S. PATENT DOCUMENTS

| 3,464,026 A | 8/1969 | Woodbury et al. |
| 4,039,851 A | 8/1977 | Jain et al. |

(Continued)

FOREIGN PATENT DOCUMENTS

| EP | 2853010 A1 | 4/2015 |
| JP | 2003051635 A | 2/2003 |

(Continued)

OTHER PUBLICATIONS

Herriott et al., "Off-Axis Paths in Spherical Mirror Interferometers", Applied Optics, vol. 3, No. 4, Apr. 1964, 4 pages.
(Continued)

*Primary Examiner* — Xinning(Tom) Niu

(57) ABSTRACT

An apparatus includes at least one Raman medium configured to receive a pump beam and shift at least a portion of the pump beam into a Stokes-shifted output beam. The apparatus also includes a first lens configured to receive and focus the pump beam into the at least one Raman medium. The apparatus further includes first and second retro-lens assemblies, each including at least one prism configured to reflect beams from the at least one Raman medium back into the at least one Raman medium and multiple second lenses configured to control optical propagation of the beams entering and exiting the at least one Raman medium. Multiple pairs of lenses form multiple confocal arrangements of lenses. The pairs of lenses include the first lens and the second lenses of the retro-lens assemblies. The at least one Raman medium is optically positioned between the lenses in the confocal arrangements of lenses.

20 Claims, 4 Drawing Sheets

(51) Int. Cl.
*H01S 3/094* (2006.01)
*H01S 3/07* (2006.01)

(52) U.S. Cl.
CPC .. *H01S 3/094042* (2013.01); *H01S 3/094061* (2013.01); *H01S 3/30* (2013.01)

(56) References Cited

U.S. PATENT DOCUMENTS

| | | | |
|---|---|---|---|
| 4,178,561 A | 12/1979 | Hon et al. | |
| 4,361,770 A | 11/1982 | Rabinowitz et al. | |
| 4,394,623 A | 7/1983 | Kurnit | |
| 4,575,645 A | 3/1986 | Komine | |
| 5,062,112 A * | 10/1991 | Buchman | H01S 3/305 372/3 |
| 5,177,566 A | 1/1993 | Leuchs et al. | |
| 5,272,717 A | 12/1993 | Stultz | |
| 5,276,548 A | 1/1994 | Margalith | |
| 5,546,222 A | 8/1996 | Plaessmann et al. | |
| 6,580,734 B1 | 6/2003 | Zimmermann | |
| 6,901,102 B1 | 5/2005 | Yanagisawa et al. | |
| 7,869,469 B1 | 1/2011 | Spuler | |
| 9,438,006 B2 | 9/2016 | Rockwell et al. | |
| 2003/0043453 A1 | 3/2003 | Smith et al. | |
| 2005/0111496 A1* | 5/2005 | Reeder | H01S 3/0606 372/9 |
| 2005/0163169 A1 | 7/2005 | Lawandy et al. | |
| 2006/0187537 A1 | 8/2006 | Huber et al. | |
| 2007/0104431 A1 | 5/2007 | Di Teodoro et al. | |
| 2008/0191604 A1* | 8/2008 | Morris | B82Y 20/00 313/499 |
| 2010/0054284 A1 | 3/2010 | Dekker et al. | |
| 2012/0314722 A1 | 12/2012 | Heller et al. | |
| 2013/0215912 A1* | 8/2013 | Shkunov | F41H 13/0056 372/3 |

FOREIGN PATENT DOCUMENTS

| | | |
|---|---|---|
| WO | 01/03260 A1 | 1/2001 |
| WO | 2008/024145 A2 | 2/2008 |
| WO | 2013/176779 A1 | 11/2013 |

OTHER PUBLICATIONS

Rabinowitz et al., "Efficient tunable H2 Raman laser", Appl. Phys. Lett. 35(10), Nov. 1979, 3 pages.
Trutna et al., "Multiple-pass Raman gain cell", Applied Optics, vol. 19, No. 2, Jan. 1980, 12 pages.
Siegman, "Lasers", 1986, 3 pages.
Koechner, "Solid-State Laser Engineering", 1937, 5 pages.
McKay et al., "Thermal lens evolution and compensation in a high power KGW Raman laser", Optics Express, vol. 22, No. 6, Mar. 2014, 13 pages.
Loiko et al., "Thermal lens study in diode pumped Ng- and Np cut Nd:KGd(WO4)2 laser crystals", Optics Express, vol. 17, No. 26, Dec. 2009, 8 pages.
Loiko et al., "Laser performance and thermal lensing in flashlamp pumped Np-cut and Ng-cut Nd:KGW crystals", Applied Physics B Lasers and Optics, Mar. 2010, 7 pages.
"SUSS MicroOptics", Jun. 2019, 20 pages.
Basiev et al., "Conversion of tunable radiation from a laser utilizing an LiF crystal containing F-2 color centers by stimulated Raman scattering in Ba(NO3)2 and KGd(WO4)2 crystals", Sov. J. Quantum Electron, 17(12), Dec. 1987, 3 pages.
Kogelnik et al., "Laser Beams and Resonators", Applied Optics, vol. 5, No. 10, Oct. 1966, 18 pages.
International Search Report and Written Opinion of the International Searching Authority dated Jul. 1, 2013 in connection with International Patent Application No. PCT/US2013/033354, 11 pages.
Extended European Search Report dated Jun. 23, 2015 in connection with European Patent Application No. 13793305.7, 6 pages.
Communication Pursuant to Rules 70(2) and 70a(2) EPC dated Jul. 10, 2015 in connection with European Patent Application No. 13793305.7, 1 page.

* cited by examiner

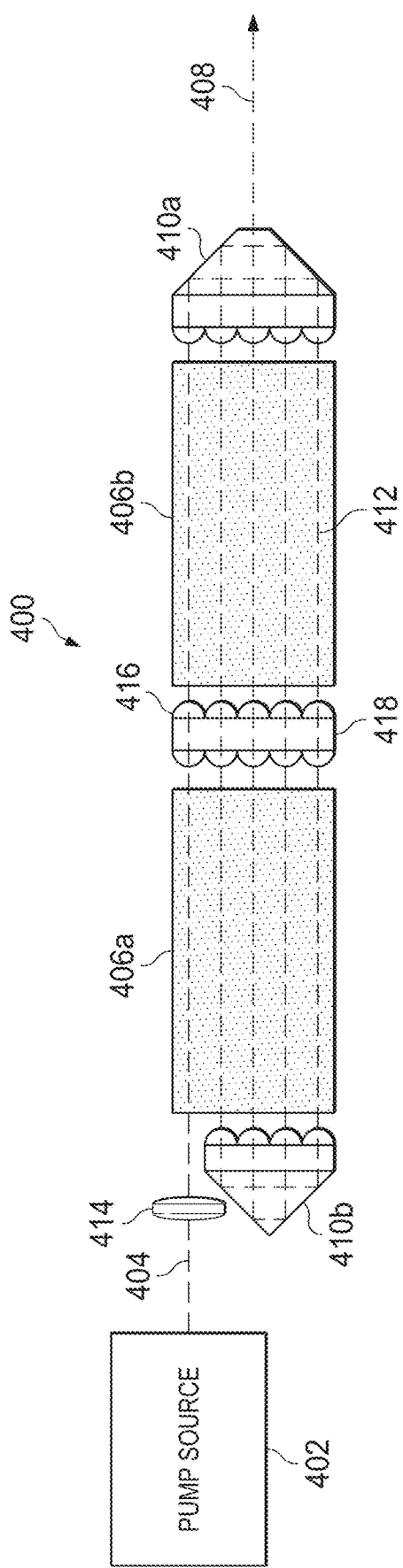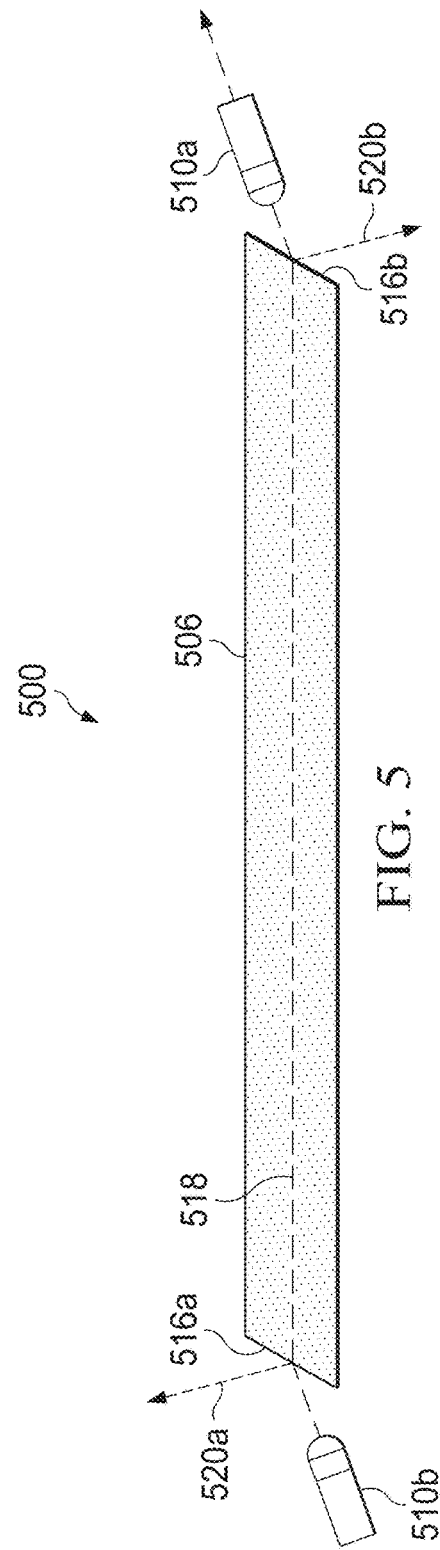

COMPACT RAMAN LASER CAPABLE OF EFFICIENT OPERATION AT LOW PEAK POWERS WITH GOOD BEAM QUALITY

TECHNICAL FIELD

This disclosure is generally directed to laser systems. More specifically, this disclosure is directed to a compact Raman laser capable of efficient operation at low peak powers with good beam quality.

BACKGROUND

A Raman laser is a specific type of laser in which light amplification is achieved using stimulated Raman scattering in a Raman medium. Stimulated Raman scattering refers to a process in which an optical beam having optical energy at a first wavelength interacts with a Raman medium such that a portion of the optical energy is deposited into the Raman medium, and the reduced optical energy results in the optical beam's propagation occurring at a longer second wavelength. The difference between the first and second wavelengths is referred to as a "Stokes" shift of the optical wavelength. It is also possible to achieve multiple Stokes shifts of the optical energy to even longer wavelengths if the product of the optical intensity of the optical beam and the length of the Raman medium is sufficiently high.

SUMMARY

This disclosure provides a compact Raman laser capable of efficient operation at low peak powers with good beam quality.

In a first embodiment, an apparatus includes at least one Raman medium configured to receive a pump beam at a first wavelength and shift at least a portion of the pump beam into a Stokes-shifted output beam at a second wavelength. The apparatus also includes a first lens configured to receive and focus the pump beam at the first wavelength into the at least one Raman medium. The apparatus further includes first and second retro-lens assemblies positioned at opposite ends of the at least one Raman medium. Each of the retro-lens assemblies includes at least one prism configured to reflect beams from the at least one Raman medium back into the at least one Raman medium. Each of the retro-lens assemblies also includes multiple second lenses configured to control optical propagation of the beams entering and exiting the at least one Raman medium. Multiple pairs of lenses form multiple confocal arrangements of lenses. The pairs of lenses include the first lens and the second lenses of the retro-lens assemblies. The at least one Raman medium is optically positioned between the lenses in the confocal arrangements of lenses.

In a second embodiment, a method includes focusing a pump beam at a first wavelength into at least one Raman medium using a first lens. The method also includes shifting at least a portion of the pump beam at the first wavelength into a Stokes-shifted output beam at a second wavelength using the at least one Raman medium. The method further includes using at least one prism of each of first and second retro-lens assemblies to reflect beams from the at least one Raman medium back into the at least one Raman medium. In addition, the method includes using multiple second lenses of each of the first and second retro-lens assemblies to control optical propagation of the beams entering and exiting the at least one Raman medium. Multiple pairs of lenses form multiple confocal arrangements of lenses. The pairs of lenses include the first lens and the second lenses of the retro-lens assemblies. The at least one Raman medium is optically positioned between the lenses in the confocal arrangements of lenses.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIG. 4 illustrates a second example compact Raman laser capable of efficient operation at low peak powers with good beam quality according to this disclosure;

FIG. 5 illustrates an example alternative arrangement of components in a compact Raman laser according to this disclosure;

DETAILED DESCRIPTION

Figure 1:
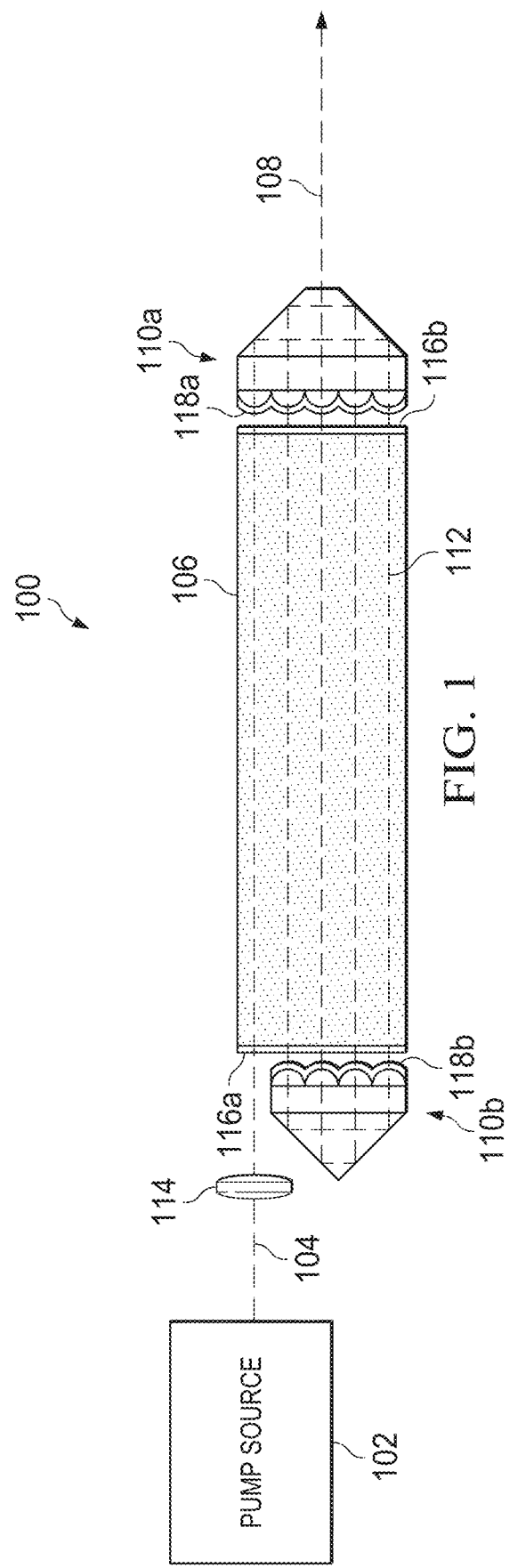
FIG. 1 illustrates a first example compact Raman laser capable of efficient operation at low peak powers with good beam quality according to this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, a Raman laser is a specific type of laser in which light amplification is achieved using stimulated Raman scattering in a Raman medium. Various pulsed Raman lasers have been developed over the years, where optical energy is provided to the Raman media in pulses rather than using continuous waves. Pulsed Raman lasers that produce optical beams are often pumped by solid-state neodymium-based lasers or other similar solid-state lasers, which typically produce pulse lengths of about ten nanoseconds and pulse energies of about ten to hundreds of millijoules. This approach can achieve pump peak powers in the range of about one to tens of megawatts or more. The pump beams can also be focused into the Raman media to produce very high peak intensities, such as in the range of about one hundred to five hundred megawatts per square centimeter or more. As a result, these pump lasers can produce sufficient peak power levels and sufficient peak intensity levels to achieve effective Raman wavelength conversion with various Raman media, including solid and gaseous Raman media.

These high peak powers and high peak intensities are typically required, because the performance of a Raman laser is related to the "gIL" value of the Raman laser. The gIL value represents a multiplication product of three parameters: "g" represents the Raman gain of the Raman medium being used and is dependent on the material(s) forming the Raman medium; "I" represents the intensity of pump beam entering the Raman medium; and "L" represents the interaction length over which wavelength conversion occurs within the Raman medium.

A Raman generator is one type of Raman laser in which the gIL value is sufficiently high so that very weak spontaneous Raman scattering generated in a Raman medium by a pump beam is sufficient to launch the Raman amplification process and convert a significant fraction of the pump beam to a desired Stokes-shifted output beam. In many Raman generators, a gIL value of about twenty to twenty-five or more is needed for the power in the Stokes-shifted output beam to reach about fifty percent or more of the original pump power. Higher gIL values enable the same Raman medium to produce second-order, third-order, or other higher-order Stokes shifts to successively longer wavelengths. Such a high gIL value may often necessitate the use of very high pump intensities ("I" values) and/or very long Raman media ("L" values), which may not be readily available for some applications.

A Raman oscillator is another type of Raman laser, one example of which locates the Raman medium between two mirrors, thereby forming a resonator. One mirror has one hundred percent reflectivity at the Stokes wavelength, and another mirror (also called an "output coupler") has a lower reflectivity at the Stokes wavelength so that some fraction of the Stokes-shifted optical energy can leave the resonator. The mirrors allow weak spontaneous Stokes power to make multiple successive amplifying passes through the Raman medium, eventually reaching a point where about fifty percent or more of the original pump power can be converted to a desired Stokes-shifted output beam that is transmitted through the output coupler. Depending on the design details, a Raman oscillator may be able to operate with a gIL value as low as about one. However, in practical situations, the requirement for many passes through the resonator can only be met with pulse lengths longer than about ten round trips through the resonator, which may be about twenty to thirty nanoseconds for a resonator length of about fifteen centimeters. This pulse length may be unsuitable for use in some applications.

A Raman amplifier is yet another type of Raman laser in which a seed laser beam at a desired Stokes-shifted wavelength is launched into a Raman medium along with a pump beam. The power of the seed beam may be as low as a few percent of the pump power but may still be many orders of magnitude higher than the spontaneous Raman scattering of the Raman medium. In this case, a gIL value of about seven to ten may be sufficient to convert about fifty percent or more of the original pump power to the Stokes-shifted seed beam. However, Raman amplifiers are generally more complex than other types of Raman lasers. For instance, a laser source for the seed beam is needed in addition to a laser source for the pump beam, and the seed and pump beams need to be spatially combined, aligned, and launched together into the Raman medium. This added complexity ultimately translates into increased size, weight, and cost for the system.

While it may seem logical to simply place a number of Raman media in series optically (where each Raman medium forms part of a different unit cell) and then pass the same optical beam through the Raman media to perform amplification sequentially, this approach suffers from a number of problems. In addition to the size, weight, and cost of using multiple Raman media in series, this approach is structurally complex and easily suffers from problems like misalignment of the components. A multi-pass cell (MPC) Raman generator represents one specific type of Raman generator in which optical beams pass through the same Raman medium multiple times. However, this type of Raman generator can still suffer from misalignment, may require the use of long Raman media, and may be designed to obtain very high peak powers and intensities. Designs for this type of Raman generator also typically do not consider how to generate output beams with good beam qualities at good efficiencies, and these designs typically do not consider thermal management issues.

This disclosure describes various compact Raman lasers capable of efficient operation at low peak powers with good beam qualities. These compact Raman lasers implement multi-pass cell Raman generators that achieve a relatively high gIL value with reduced or minimal complexity. Each compact Raman laser described below allows a pulsed pump laser generating a relatively low peak power (such as about ten to twenty kilowatts or less) to produce a sufficiently high integrated Raman gIL to produce and generate one or more Stokes shifts within at least one Raman medium. A first lens focuses a pump beam as it enters the at least one Raman medium. Retro-lens assemblies are positioned at opposite ends of the at least one Raman medium and include multiple prisms and multiple lenses. The prisms reflect beams back into the Raman medium to support multiple passes of the pump beam's energy through the Raman medium, and the lenses control the optical propagation of the beams entering and exiting the at least one Raman medium. One of the retro-lens assemblies eventually allows a Stokes-shifted output beam to exit the Raman medium.

Multiple pairs of lenses here define multiple confocal arrangements of lenses, where each pair of lenses includes one lens on one end of a Raman medium and another lens on the opposite end of the Raman medium. As a result, the Raman medium is optically positioned between the two lenses of a confocal arrangement, signifying that the two lenses share a common focal plane for the pump and signal beams. "Optically positioned" here indicates that optical energy is focused within the Raman medium by one lens in a confocal arrangement, and the other lens in the confocal arrangement receives the optical energy from the Raman medium. Effectively, this approach defines multiple unit cells, but the unit cells are all associated with the same Raman medium or media. An input pump beam is focused and passes through the at least one Raman medium. A resulting first-pass beam is recollimated, reflected, and translated into an adjacent lens, where it is refocused into the at least one Raman medium to form a second-pass beam. The resulting second-pass beam is recollimated, reflected, and translated into an adjacent lens, where it is refocused back into the at least one Raman medium to form a third-pass beam. This can be repeated any suitable number of times.

Each Raman medium can be formed as a single slab-shaped crystal having a sufficiently large cross-sectional area so that multiple non-overlapping passes of the beams can be made through the Raman medium. Because of this, optical energy may pass through the same Raman medium or media a large number of times, such as between three to nine times (although other numbers of passes may be used). This supports the use of stimulated Raman scattering within a compact physical package. Also, the collective length of the multiple passes through the at least one Raman medium, the focused intensities of the beams averaged along each pass, and the material(s) forming the at least one Raman medium result in a suitable gIL value for achieving a desired level of Raman conversion.

Confocal arrangements of lenses are used here since they offer improved or maximal mode discrimination during Raman conversion, which enables nearly diffraction-limited operation. In other words, the confocal arrangements of lenses help to discriminate against higher-order spatial modes while allowing a single fundamental mode to pass. In some cases, the best selectivity occurs for a confocal resonator with a Fresnel number of about 0.6 to about 2.0. In addition to the mode discrimination of the optimal resonator architecture, the good beam quality of the pump beam can also be quite effective in promoting good beam quality in the Stokes-shifted output beam. This arises from gain filtering, which is a mode control mechanism that promotes single-mode operation by ensuring that the desired fundamental mode has higher gain than competing modes. In the Raman lasers discussed below, gain filtering arises from the fact that the only portion of a Raman medium that offers Raman amplification is that portion of the Raman medium containing the pump beam. Since the fundamental mode of the Stokes beam will have the greatest spatial overlap with the single-mode pump beam, the fundamental mode of the Stokes beam will have the greatest gain.

Moreover, high-precision prisms and lenses may be precisely and easily fabricated using any suitable techniques now known or later developed. If the lenses are formed on, or as part of the prisms, or as part of another structure that is bonded or otherwise attached to the prisms, this also creates all-glass structures or other integrated structures that redirect and refocus beams along their respective passes through the at least one Raman medium. The integrated structures can also help to reduce or minimize parts counts, reduce or eliminate misalignment problems, and provide more robust structures for use in harsh environments. In some cases, the lens size(s), spacing(s), and optical performance reproducibility can be controlled in a highly precise manner, such as when the lenses are fabricated as a monolithic array using photolithographic processes.

A thermal management strategy for the Raman lasers discussed below exploits the advantages of a slab geometry for the at least one Raman medium, producing more-uniform temperatures across the wider dimension of each Raman medium. Appreciable thermal gradients may generally exist only in the narrower dimension of each Raman medium. The Raman lasers described here recognize that this inherent anisotropic thermal response of the rectangular slab geometry of each Raman medium, along with a judicious orientation of the crystal axes within the slab geometry of each Raman medium, can be exploited to at least partially compensate for the inherently anisotropic thermal properties that may accompany each specific Raman medium. Thus, these designs leverage the basic slab geometry to ensure that both a compact package and effective thermal management can be obtained.

Some embodiments of the Raman lasers disclosed in this patent document may operate using relatively low peak pump powers and relatively low peak intensities. For example, embodiments of the Raman lasers discussed below may operate using an average pump power of about ten watts, a pulse repetition frequency of about one megahertz or more, and a minimum pulse energy of about ten microjoules while attempting to minimize size, weight, power, and complexity of the overall system. In particular embodiments, a fiber-based pump laser may be used to provide the pump power to a Raman medium, since (i) fiber lasers are often very effective at generating acceptable peak powers at high pulse repetition frequencies and low pulse energies, and (ii) fiber lasers are often highly compatible with size, weight, power, and complexity requirements. The pulse length for the pump power is discretionary and, in some embodiments, may be about one nanosecond, which (when combined with a pulse energy of about ten microjoules) defines an operational target of about ten kilowatts of peak power. In order to produce such a peak power level at the Stokes-shifted wavelength, the initial pump peak power may be about twenty kilowatts to thirty kilowatts. As can be seen here, this is two to three orders of magnitude smaller than what has been typically used. Regardless of that, in some cases, embodiments of the Raman lasers discussed below can have gIL values of about fifty to sixty (when all passes through their Raman media are considered) and achieve efficiencies of about fifty percent or more with a beam quality of about 1.5 or less. Also, in some cases, these Raman lasers may be highly compact, such as when the longest dimensions of the Raman lasers are about ten centimeters to fourteen centimeters or less. Note, however, that these values above are for illustration only and can easily vary depending on the implementation. Also note that the approaches described below can be used with a wide variety of Raman media, including solid and gaseous Raman media.

FIG. 1 illustrates a first example compact Raman laser 100 capable of efficient operation at low peak powers with good beam quality according to this disclosure. As shown in FIG. 1, the Raman laser 100 includes a pump source 102, which operates to produce a pump beam 104. The pump beam 104 represents an input beam of optical energy that is provided to a Raman medium 106 for use in generating a Stokes-shifted output beam 108.

The pump source 102 represents any suitable source of optical energy. In some embodiments, the pump source 102 represents a pulsed laser, such as a pulsed fiber laser. Note, however, that the use of a fiber laser is optional and that other forms of pump lasers may be used here. The pump beam 104 represents any suitable beam of optical energy that triggers Raman conversion in the Raman medium 106. In some embodiments, the pump beam 104 may represent optical energy having an average pump power of about ten watts, a pulse repetition frequency of about one megahertz or more, a minimum pulse energy of about ten microjoules, and a pulse length of about one nanosecond. Note, however, that other characteristics may be used for the pump beam 104 as needed or desired. The pulses of the pump beam 104 may also have any suitable temporal shape, such as square pulses or pulses of other shapes.

The Raman medium 106 represents a structure that shifts at least some of the optical energy from the pump beam 104 using stimulated Raman scattering to produce the Stokes-shifted output beam 108. The output beam 108 is at a different (longer) wavelength than the pump beam 104 due to the effects of stimulated Raman scattering within the Raman medium 106. Depending on the size of the Raman medium 106 and the number of passes of the optical energy through the Raman medium 106, the output beam 108 may be the result of a single Stokes shift of the pump beam 104 or the result of multiple Stokes shifts of the pump beam 104 in the Raman medium 106.

The Raman medium 106 may be formed from any suitable material(s) that cause stimulated Raman scattering. The Raman medium 106 may also have any suitable size, shape, and dimensions. In some embodiments, the Raman medium 106 represents a rectangular or other slab of crystalline material, such as potassium gadolinium tungstate (KGW). In particular embodiments, the Raman medium 106 represents a rectangular slab of crystalline material having dimensions of about seventy millimeters by about ten millimeters by about one millimeter. In addition, the Raman medium 106 may be formed in any suitable manner. The output beam 108 represents any suitable beam of optical energy produced by Raman conversion in the Raman medium 106. In some embodiments and for some pulse lengths, the output beam 108 may represent optical energy having an output power of about ten kilowatts.

As shown here, a lens 114 focuses the pump beam 104 into the Raman medium 106, and retro-lens assemblies 110a-110b are positioned on opposite ends of the Raman medium 106. Each retro-lens assembly 110a-110b is configured to receive beams 112 of optical energy arriving from the Raman medium 106 and to reflect the beams 112 back into the Raman medium 106. The beams 112 shown in FIG. 1 represent optical energy originally from the pump beam 104 but evolving to a mixture of reduced energy from the pump beam along with increased energy generated by the Raman process within the Raman medium 106 in various passes of the optical energy through the Raman medium 106, where the last beam 112 is eventually output as the Stokes-shifted output beam 108. The retro-lens assemblies 110a-110b here can reflect the beams 112, such as by 180°, so that the beams 112 are parallel and anti-parallel to one another within the Raman medium 106. "Parallel" indicates that two beams are parallel and travel in the same direction through the Raman medium 106, while "anti-parallel" indicates that two beams are parallel and travel in opposite directions through the Raman medium 106.

As described below, each of the retro-lens assemblies 110a-110b includes a prism that folds or reflects the beams 112 and a lens array that controls the optical propagation of the beams 112 entering and exiting the Raman medium 106. The prism of the retro-lens assembly 110a also includes a flat facet or other surface that allows the final beam 112 to exit the Raman laser 100 as the output beam 108. As noted above, the lens 114 here focuses the pump beam 104 into the Raman medium 106. The lenses of the retro-lens assemblies 110a-110b and the lens 114 form multiple confocal arrangements, where each confocal arrangement includes (i) one lens of the retro-lens assembly 110a and (ii) one lens of the retro-lens assembly 110b or the lens 114. The Raman medium 106 is optically positioned between the lenses of each confocal arrangement. In these arrangements, each beam 112 will reach focus halfway along its pass through the Raman medium 106. Each arrangement thereby focuses optical energy for each of multiple passes of the optical energy through the Raman medium 106, thereby enabling the use of stimulated Raman scattering in a compact physical package. As noted above, confocal arrangements of lenses are useful since they offer a high integrated intensity-length product along with improved or maximal mode discrimination during Raman conversion.

Each of the retro-lens assemblies 110a-110b represents any suitable structure(s) configured to retro-reflect or fold optical energy and to focus optical energy. Example embodiments of the retro-lens assemblies 110a-110b are provided in FIGS. 2 and 3, which are described below. Note that the number of lenses and the number of passes of optical energy through the Raman medium 106 allowed by the retro-lens assemblies 110a-110b can vary based on various factors, such as the dimensions of the Raman medium 106, the number of passes through the Raman medium 106, and the desired number of Stokes shifts. In this example, the optical energy from the pump beam 104 makes five passes through the Raman medium 106, although other numbers of passes may be used. The lens 114 represents any suitable structure configured to focus the pump beam 104 into the Raman medium 106, with the focus being positioned to achieve a confocal configuration with one lens in the retro-lens assembly 110a. Note that while the lens 114 is shown here as being separate from the retro-lens assembly 110b, the lens 114 might be attached to or formed as a part of the retro-lens assembly 110b.

In some embodiments, anti-reflection coatings 116a-116b may be provided on the input and output faces of the Raman medium 106, and/or anti-reflection coatings 118a-118b may be provided on faces of the lenses in the retro-lens assemblies 110a-110b. The anti-reflection coatings 116a-116b, 118a-118b can reduce or minimize optical energy that reflects off surfaces of the Raman medium 106 and the lenses as the beams 104, 108, 112 enter and exit the Raman medium 106 and the lenses. Note that any other or additional anti-reflection coatings may also be used in the Raman laser 100, such as on the lens 114 or the flat hypotenuse of the retro-lens assembly 110a. The anti-reflection coatings 116a-116b, 118a-118b may be formed from any suitable material(s) and in any suitable manner.

Note that in FIG. 1, a limited number of components need to be positioned and aligned properly in order for the Raman laser 100 to operate correctly. In some cases, two of those components (the retro-lens assemblies 110a-110b) may be integrated all-glass or other integrated structures, which can significantly ease integration of the Raman laser 100. For instance, photolithographic or other formation of the lenses on the prisms of the retro-lens assemblies 110a-110b can help to ensure proper alignment of the lenses with the prisms, so a one-time alignment of the retro-lens assemblies 110a-110b with the Raman medium 106 may be needed here. Once that alignment is accomplished, the Raman medium 106 and the retro-lens assemblies 110a-110b may be fixed in place (such as on a support structure), and these components may be inserted into a Raman laser package as a single monolithic assembly.

As a particular example of an alignment process, assume a total of five optical paths will be traversed by optical energy through the Raman medium 106 as shown in FIG. 1. Here, the retro-lens assemblies 110a-110b may have six degrees of freedom when being aligned, namely three angular degrees of freedom and three translational degrees of freedom. Once those alignments have been completed, eleven individual components (nine lenses and two prisms) will have been aligned relative to each other. The two aligned retro-lens assemblies 110a-110b can thereby define five optical paths, and the Raman medium 106 can be inserted into the space between the two retro-lens assemblies 110a-110b and aligned to intersect the five optical paths. The Raman medium 106 itself can have three angular degrees of freedom, and the yaw and pitch directions of the Raman medium 106 (assuming the wide transverse dimension of the crystal of the Raman medium 106 is oriented horizontally) may be most important in ensuring that the propagation of the five optical paths is aligned parallel to the desired crystal axis that optimizes the Raman amplification process. The remaining roll angular degree of freedom for the Raman medium 106 can be adjusted along with the transverse translational degrees of freedom to ensure that none of the five optical paths strikes an edge of the Raman medium 106 (either in the entry or exit face) as described in more detail below with reference to FIG. 6. If needed or desired, a polarization-rotation mechanism may also be provided to ensure that the polarization state of the optical beams 112 is always at the proper orientation relative to crystal axes of the Raman medium 106.

It should be noted here that the present design, which is based on the confocal arrangement of lenses formed by the lenses of the retro-lens assemblies 110a-110b and the lens 114, cannot be scaled to a higher gIL product simply by inserting additional Raman crystals into the unit cell (which would increase the total crystal length). This is due to the fact that the pump beam's area (denoted A) and path length (denoted L) between the two lenses that help form a unit cell are inter-related, such that the ratio L/A (which directly drives the magnitude of gIL) is constant and independent of the specific value of the length. This inter-relationship can be understood from the fact that an increase in the length L translates into a corresponding increase in the focal lengths of the two lenses so that the lenses maintain their confocal arrangement (since the focal points still coincide in a common plane). However, increasing the focal lengths also results in corresponding increases in the sizes of the optical beams at the confocal point, which reduces the intensity. As a result, the benefit of doubling the length of a Raman medium, for example, is cancelled by the doubling of the beam area and the halving of the intensity, meaning there is no net change to the gIL product of the Raman medium. The Raman laser 100 here avoids this issue by effectively providing multiple identical unit cells, all using the same Raman medium 106, with multiple confocal arrangements of lenses. This allows the gIL value to scale linearly in proportion to the number of times that optical energy traverses the Raman medium 106, with all traversals occurring in equivalent unit cells.

Although FIG. 1 illustrates a first example of a compact Raman laser 100 capable of efficient operation at low peak powers with good beam quality, various changes may be made to FIG. 1. For example, the sizes, shapes, and dimensions of the Raman laser 100 and its individual components can vary as needed or desired. As a particular example, the Raman medium 106 and the retro-lens assemblies 110a-110b can be easily resized or otherwise redesigned to support any suitable number of passes of optical energy through the Raman medium 106. Also, the pump source 102 may be positioned close to or remote from the Raman medium 106, and an optical fiber may be used to transport the pump beam 104 from the pump source 102 to the Raman medium 106.

Figure 2:
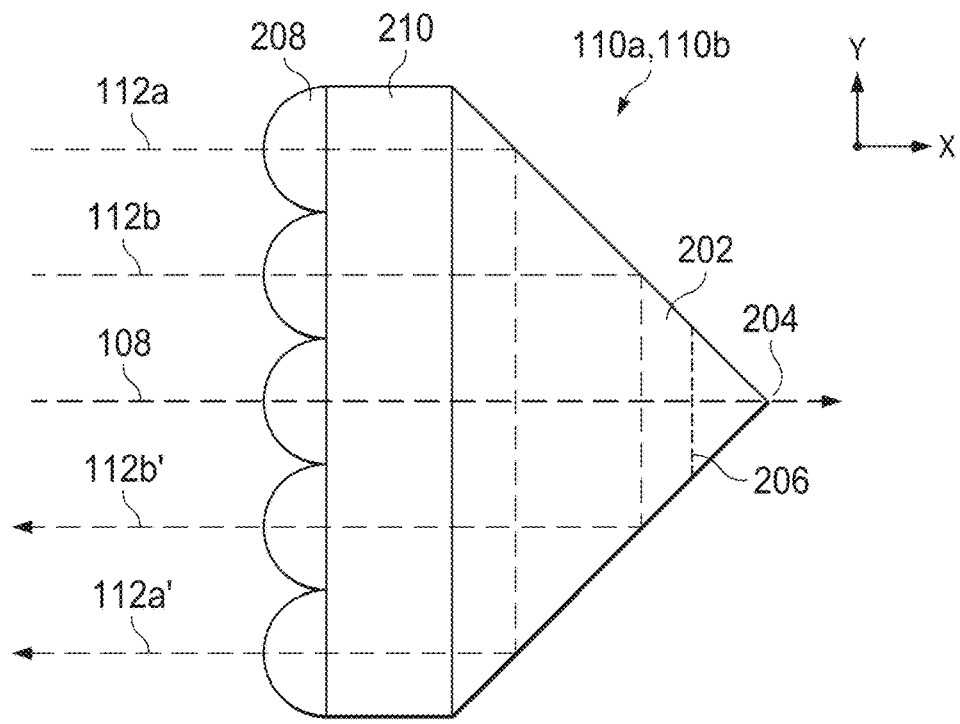
FIGS. 2 and 3 illustrate example retro-lens assemblies for use in a compact Raman laser according to this disclosure.
Figure 3:
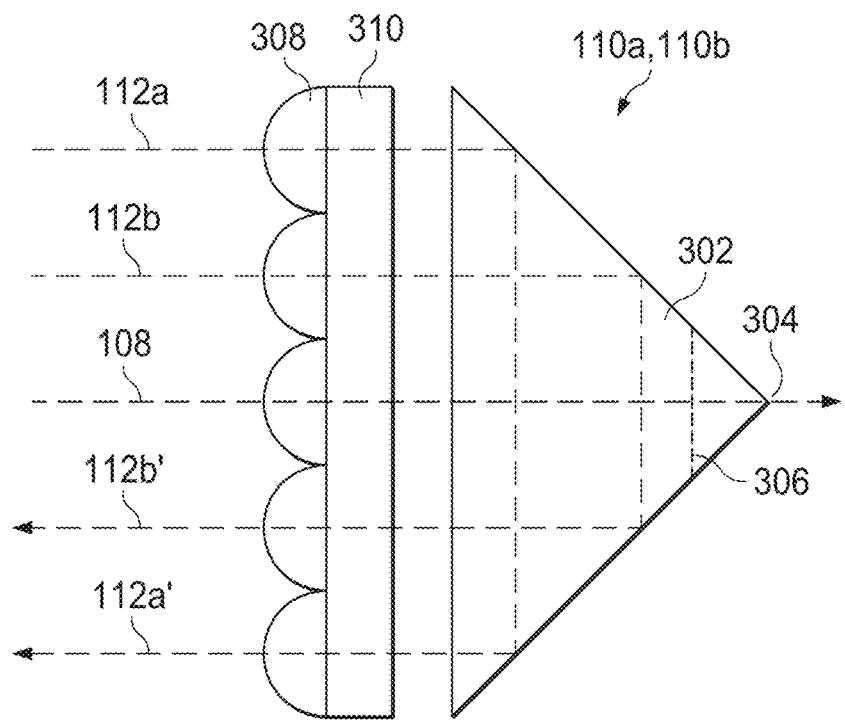

FIGS. 2 and 3 illustrate example retro-lens assemblies 110a-110b for use in a compact Raman laser according to this disclosure. For ease of explanation, the retro-lens assemblies 110a-110b of FIGS. 2 and 3 are described as being used in the Raman laser 100 of FIG. 1. However, the retro-lens assemblies 110a-110b may be used with any other suitable laser, such as those discussed below.

As shown in FIG. 2, the retro-lens assembly 110a-110b in this embodiment includes a folding prism 202. The prism 202 is configured to receive a beam 112a from the Raman medium 106 and to fold or reflect the beam 112a, via internal reflection from the two reflecting facets forming the right-hand boundaries of the prism 202, back into the Raman medium 106 as a beam 112a'. The prism 202 can perform this function for any suitable number of beams, such as beams 112b and 112b', in order to support a desired number of passes of optical energy through the Raman medium 106. In the example of FIG. 2, the two reflecting facets of the prism 202 meet at a point 204, which is shown in FIG. 1 as being used in the retro-lens assembly 110b. If the prism 202 is used by the retro-lens assembly 110a, a surface 206 in the form of a flat facet may instead join the two side facets of the prism 202, which forms a flat surface that is oriented to be nominally perpendicular to the beam 108. This surface 206 allows the beam 108 to exit the prism 202 as the output beam 108. Alternatively, the surface 206 might be oriented at a slight angle relative to being perpendicular to the beam 108 so that reflections of optical energy are directed away from the retro-lens assemblies 110a-110b and optical paths of the pump beam 104 and the Stokes-shifted output beam 108. This would prevent such reflections from following multiple passes backwards through the Raman medium 106 to be amplified and thereby reducing the gain for the desired output beam 108. In some cases, tilting the reflected beam in a direction perpendicular to the plane of FIGS. 2 and 3 may be a preferred direction, but any tilt direction may be useful here. The prism 202 may be formed from any suitable material(s), such as a glass like fused silica or a polymer. The prism 202 may also be formed in any suitable manner, such as machining and polishing. The prism 202 may further have any suitable size, shape, and dimensions.

An array of lenses 208 is positioned to affect the propagation of the beams 112 as the beams 112 travel back and forth through the Raman medium 106. For a beam 112 entering the Raman medium 106, a lens 208 will focus the beam 112 at a location halfway along the crystal length of the Raman medium 106. For a beam 112 leaving the Raman medium 106, a lens 208 will re-collimate the beam 112 and restore the propagation characteristics of the beam 112 prior to it being focused. Each lens 208 may provide any suitable amount of focus depending, at least in part, on the dimensions of the Raman medium 106. Note that, for example, the path of the beam 112a through the retro-lens assembly 110a, 110b is the same as that of the beam 112b. Specifically, referring to FIG. 2, it can be seen that the beam 112a has a shorter propagation path in the horizontal direction (along the "X" axis in FIG. 2) than the beam 112b and a longer propagation in the vertical direction (along the "Y" axis in FIG. 2) than the beam 112b. Conversely, it can be seen that the beam 112b has a longer propagation path in the horizontal direction than the beam 112a and a shorter propagation in the vertical direction than the beam 112a. Hence, each beam 112 can have a path length from its respective lens 208 where the beam 112 enters a retro-lens assembly 110a, 110b until the following lens 208 where the beam 112 re-enters the Raman medium 106 that is equal to the path lengths of all other beams 112. This ensures that any propagation effects accumulated during propagation through the retro-lens assembly 110a, 110b are identical for all beam paths.

In some embodiments, each lens 208 may have an aperture from about ten microns to 1.5 millimeters. In particular embodiments, each lens 208 may have a focal length of about forty-five millimeters and an aperture diameter of about 800 microns (where a beam size at the lens may have a diameter of about 210 microns), and an "f number" of about f/215 (where a beam diameter at the focus might be about one hundred fifty microns). The lenses 208 may be formed from any suitable material(s), such as a glass like fused silica or a polymer. The lenses 208 may also be formed in any suitable manner, such as photolithography. The lenses 208 may further have any suitable size(s), shape(s), and dimensions, and the lenses 208 may or may not be evenly spaced depending on how the beams 112 are reflected. In some embodiments, the lenses 208 may represent a monolithic micro-lens array (MLA) or other monolithic array of lenses. Note that while five lenses 208 are shown here, each of the retro-lens assemblies 110a-110b may include any suitable number of lenses 208. Also note that the lenses 208 may or may not have the same radius of curvature. In addition, note that gaps or spaces may or may not exist between adjacent lenses 208.

In this example, the lenses 208 are formed on or as a part of a support bar 210. The support bar 210 represents a substrate in or on which the lenses 208 can be formed. The support bar 210 may be bonded or otherwise attached to the prism 202 in FIG. 2, such as via an index-matching bonding material. The support bar 210 may be formed from any suitable material(s), such as a glass like fused silica or a polymer. In some embodiments, the support bar 210 may be fabricated from the same material(s) used to form the lenses 208. The support bar 210 may also be formed in any suitable manner, such as machining and polishing. The support bar 210 may further have any suitable size, shape, and dimensions. In some embodiments, for instance, the support bar 210 may have a thickness (measured side-to-side in FIG. 2) of about two millimeters. Note, however, that the use of the support bar 210 is not required and that the lenses 208 may be formed on or as a part of the prism 202.

As shown in FIG. 3, the retro-lens assembly 110a-110b in this embodiment includes a folding prism 302, which has sides that meet at a point 304 or that are joined by a surface 306 in the form of a flat facet or a tilted surface. The retro-lens assembly 110a-110b also includes lenses 308 and a support bar 310. These components may be the same as or similar to the corresponding components in FIG. 2. However, in this example, the support bar 310 is not joined to the prism 302 and is instead separated from the prism 302. This may allow, for instance, translational or angular adjustments of the support bar 310 relative to the prism 302 to be made. Once aligned, the prism 302 and the support bar 310 may be attached or otherwise secured to a base plate or other structure to maintain alignment. While not shown here, one or more anti-reflection coatings may be used on any of the surfaces of the lenses 308 and the support bar 310 and the hypotenuse of the prism 302 to reduce reflections caused by the beams 112 traveling between the prism 302 and the support bar 310.

Although FIGS. 2 and 3 illustrate examples of retro-lens assemblies 110a-110b for use in a compact Raman laser, various changes may be made to FIGS. 2 and 3. For example, the sizes of the prisms 202, 302 and the number and pitch of the lenses 208, 308 may be modified as needed or desired in order to support any suitable number of passes of optical energy through the Raman medium 106. Also, the retro-lens assemblies 110a-110b used in a Raman laser may or may not have a common design. In addition, other designs of the retro-lens assemblies 110a-110b are possible and may be used in the Raman laser 100 or in another laser.

FIG. 4 illustrates a second example compact Raman laser 400 capable of efficient operation at low peak powers with good beam quality according to this disclosure. As shown in FIG. 4, the Raman laser 400 includes a pump source 402, which operates to produce a pump beam 404. The Raman laser 400 also produces a Stokes-shifted output beam 408 and includes retro-lens assemblies 410a-410b that facilitate the production of various beams 412 of optical energy. The Raman laser 400 further includes a lens 414 that focuses the pump beam 404. These components may be the same as or similar to corresponding components shown in FIG. 1. Note that while the retro-lens assemblies 410a-410b here are the same as or similar to the retro-lens assemblies 110a-110b shown in FIG. 2, other designs for the retro-lens assemblies 410a-410b may be used, such as the design shown in FIG. 3.

In this example, the Raman laser 400 includes two Raman media 406a-406b arranged in series and separated by an array of double-sided lenses 416. Each of the Raman media 406a-406b may be the same as or similar to the Raman medium 106 described above. In some embodiments, for example, each of the Raman media 406a-406b may represent a rectangular slab of KGW or other crystalline material having dimensions of about seventy to one hundred millimeters by about ten millimeters by about one to two millimeters, although any other suitable materials and dimensions may be used here.

Each of the double-sided lenses 416 in this example represents two lenses positioned on opposite sides of a support bar 418. One lens in each double-sided lens 416 is used to form a confocal arrangement with a lens in one retro-lens assembly 410a (with the Raman medium 406b optically positioned between the lenses of the confocal arrangement). Another lens in each double-sided lens 416 is used to form a confocal arrangement with the lens 414 or a lens in the other retro-lens assembly 410b (with the Raman medium 406a optically positioned between the lenses of the confocal arrangement).

The lenses 416 and the support bar 418 may be formed from any suitable material(s), such as a glass like fused silica or a polymer. The lenses 416 may be formed in any suitable manner, such as photolithography. The support bar 418 may be formed in any suitable manner, such as machining and polishing. The lenses 416 and support bar 418 may further have any suitable size(s), shape(s), and dimensions, and the lenses 416 may or may not be evenly spaced depending on how the beams 412 are reflected. The lenses 416 may or may not have the same radius of curvature, and gaps or spaces may or may not exist between adjacent lenses 416.

While not shown here, one or more components of the Raman laser 400 may include one or more anti-reflection coatings. For instance, anti-reflection coatings may be used with the Raman media 406a-406b and the retro-lens assemblies 410a-410b in the same or similar manner as the anti-reflection coatings 116a-116b, 118a-118b described above. One or more other or additional anti-reflection coatings may similarly be used with the lens 414 and/or the array of double-sided lenses 416.

In some embodiments, the array of double-sided lenses 416 may be fabricated so that there is very little if any transverse offset between corresponding lenses 416 on opposite sides of the support bar 418. For example, corresponding lenses 416 on opposite sides of the support bar 418 may have a transverse offset of less than about one to two microns. Various manufacturers are able to achieve these small tolerances, such as SUSS MICROOPTICS SA.

Although FIG. 4 illustrates a second example of a compact Raman laser 400 capable of efficient operation at low peak powers with good beam quality, various changes may be made to FIG. 4. For example, the sizes, shapes, and dimensions of the Raman laser 400 and its individual components can vary as needed or desired. As a particular example, the Raman media 406a-406b and the retro-lens assemblies 410a-410b can be easily resized or otherwise redesigned to support any suitable number of passes of optical energy through the Raman media 406a-406b. Also, the pump source 402 may be positioned close to or remote from the Raman media 406a-406b, and an optical fiber may be used to transport the pump beam 404 from the pump source 402 to the Raman medium 406a. In addition, more than two Raman media may be used in a Raman laser, in which case an array of double-sided lenses 416 may be positioned and used between each consecutive pair of Raman media.

FIG. 5 illustrates an example alternative arrangement of components in a compact Raman laser 500 according to this disclosure. In this example, a Raman medium 506 is shown as a view of its narrow dimension (which may be about one millimeter thick in some embodiments). The Raman medium 506 is provided with faceted or angled input and output faces 516a-516b for multiple beams that pass through the Raman medium 506. Also, retro-lens assemblies 510a-510b are shown here with an edge view and are oriented obliquely with respect to the input and output faces 516a-516b (rather than co-planar as in FIGS. 1 and 4). A line 518 represents one of the multiple beam paths, as viewed perpendicular to the narrow dimension of the Raman medium 506, and illustrates how optical energy refracts into and out of the Raman medium 506 at input and output surfaces 516a and 516b. The line 518 thereby shows how the retro-lens assemblies 510a-510b can be positioned relative to the Raman medium 506.

In this arrangement, the angles of the input and output faces 516a-516b of the Raman medium 506 and the positioning of the retro-lens assemblies 510a-510b may be selected in order to obtain a desired coupling of optical energy into and out of the Raman medium 506 while ensuring that the optical paths of the pump and Stokes-shifted beams, which are represented by the beam path 518, are parallel to the larger surfaces of the Raman medium 506. This arrangement may also ensure that (i) any reflections 520a-520b of optical energy from the input and output faces 516a-516b of the Raman medium 506 are directed away from the optical path 518 as well as from the retro-lens assemblies 510a-510b and (ii) the reflections of optical energy are directed in other directions, such as towards one or more beam dumps or other terminations.

Although FIG. 5 illustrates one example of an alternative arrangement of components in a compact Raman laser 500, various changes may be made to FIG. 5. For example, while not shown here, one or more anti-reflection coatings may be used with one or more of the components in the Raman laser 500. Also, while the retro-lens assemblies 410a-410b here are the same as or similar to the retro-lens assemblies 510a-510b shown in FIG. 2, other designs for the retro-lens assemblies 510a-510b may be used, such as the design shown in FIG. 3. In addition, while a single Raman medium 506 is shown here, multiple Raman media may be used. In that case, the input face 516a of the first Raman medium and the output face 516b of the last Raman medium may match those shown here.

Figure 6:
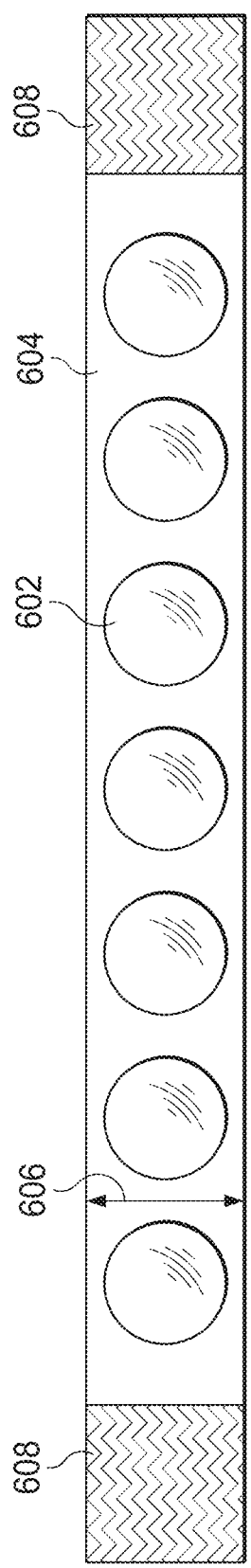
FIG. 6 illustrates an example positioning of lenses in a retro-lens assembly relative to a Raman medium according to this disclosure.

FIG. 6 illustrates an example positioning of lenses 602 in a retro-lens assembly relative to a Raman medium 604 according to this disclosure. In particular, FIG. 6 illustrates an example arrangement of the lenses 602 relative to a cross-sectional shape of at least one Raman medium 604. The lenses 602 here may represent any of the lenses in any of the retro-lens assemblies 110a-110b, 410a-410b, 510a-510b discussed above, and the at least one Raman medium 604 may represent any of the Raman media 106, 406a-406b, 506 discussed above.

A practical design of a solid-state laser typically needs to include an effective strategy for managing the impact of inherent thermal loads on the laser's performance. The initial challenge is to provide sufficient cooling of the Raman medium 604 so that its average temperature remains within limits established by the temperature dependence of the laser parameters or by stress-fracture tolerances. In other words, this initial challenge is to prevent physical damage to the Raman medium 604 caused by temperatures during use. Beyond these limits, another challenge is to reduce or minimize performance degradations arising from thermal lensing. Thermal lensing arises when transverse temperature gradients become sufficiently large so that, in combination with dependence of the refractive index n of the Raman medium 604 on temperature, significant spatial variations in the refractive index appear. More specifically, temperature gradients induce refractive-index gradients, which can affect the propagation direction and divergence of a laser beam passing through the Raman medium 604. Another physical manifestation of temperature gradients is the inducement of stresses in the Raman medium 604 caused by thermal expansion. This generates strains in the Raman medium 604 that produce additional refractive-index variations via photo-elastic effects, with the principal concern being depolarization of the optical beams.

The impact of these strain-induced refractive-index changes can depend on the polarization of the optical energy. For the circular cross-sections of laser rods, the resulting index change has two values, one for the radial component and one for the tangential component of polarized light, so the rod can act as a bifocal lens with different focal lengths for optical energy having radial and tangential polarizations. Because of this bifocal complication, one approach attempts to compensate for thermal lensing by inserting a fixed compensating lens into the beam path, but this imperfect compensation cannot fully neutralize the thermal lensing and maintain the desired laser beam quality. Moreover, beam depolarization can lead to significant losses if any polarizers are in the beam path, as is very often the case with solid-state lasers that incorporate polarization-based Q-switches. The impact of strain-induced refractive-index changes on crystalline Raman lasers can be even more significant, since Raman gain is often dependent on the orientation of the polarization of the pump and signal beams relative to a preferred crystal axis. If the pump beam and/or signal beam becomes depolarized, the effective gIL value decreases, which represents a nonlinear loss by reducing the exponential gain within the Raman crystal. In addition, these thermal challenges in solid-state lasers can be particularly difficult to manage in materials such as KGW for which the relevant material properties (including dn/dT, thermal expansion, and thermal conductivity) are all highly anisotropic.

One possible thermal management approach for the Raman lasers described above is based on the concept of matching a thermally-anisotropic material to the anisotropic thermal geometry of a high-aspect-ratio slab used as the Raman medium 604. For example, consider the fact that the rectangular geometry naturally results in a minimal temperature gradient in the wide dimension, and assume that the Raman medium 604 has different values of thermal conductivity. Under these circumstances, one approach might be to orient the higher thermal conductivity in the narrow dimension in order to minimize the gradient in that dimension. The resulting weaker thermal expansion in the wide dimension has only minor consequences, because the basic geometry already minimizes any temperature gradients in that direction. An analogous opportunity exists in media where the temperature dependence of the refractive index varies with the orientation of the temperature gradient relative to the crystal axes. One result here is that this geometry and any thermal anisotropies in the Raman medium 604 can be exploited to help ensure that both a compact package and effective thermal management are obtained. As a direct consequence of the high-aspect-ratio slab used as the Raman medium 604, detailed analysis and physical measurements can confirm that the primary temperature gradients in the slab-shaped Raman medium 604 essentially align in a single direction, which is perpendicular to the wide slab faces and is represented by a line 606 in FIG. 6.

Stress-induced birefringence is mainly limited to a small fraction of the total width at either edge of the slab, and these regions 608 are identified in FIG. 6. More uniform one-dimensional heat propagation dominates across the remainder of the Raman medium 604. Because of this nature of the heat flow, there is typically no significant heat flow in the wide dimension in the area between the regions 608, while all or substantially all of the cooling may be accomplished in the narrow dimension. Because of this anisotropy in the cooling, this design is relatively insensitive to any anisotropy that the Raman medium 604 may have in the thermal conductivity in the two transverse dimensions. As a result, any thermal lensing typically arises only in the narrow dimension and manifests itself as a weak cylindrical lens, which in some embodiments may be compensated as described below. All of the lenses 602 of a micro-lens assembly are positioned here to avoid the regions 608 of stress birefringence at the narrow ends of the slab cross-section.

Compensation for thermal lensing can be used here so that it does not degrade the optical quality of the designed-in lensing in a unit cell. As a quantitative estimate of the magnitude of the thermal lens, assume an output power of ten watts at a final wavelength of nine hundred nanometers. These conditions yield a rough estimate of the thermal load of about 1.6 watts, due to the quantum defect of the Raman wavelength conversion. Assuming a KGW crystal as the Raman medium 604 is oriented with the highest thermal conductivity in the narrow dimension of the slab, a calculation of the resulting temperature between the central plane of the thin dimension and the outer surface yields a temperature difference of about 0.4 Kelvin. This temperature change produces a very small refractive-index difference of about $-6 \times 10^{-6}$, and the resulting focal length of each cylindrical thermal lens 602 is about twenty centimeters within the Raman medium 604 or about forty centimeters in air. Using available values of KGW heat capacity, steady-state thermal gradients can be established fairly quickly across a millimeter-scale KGW crystal in about two milliseconds. The above numerical estimates are based on a single assumed orientation of the crystal axes relative to the rectangular shape, but an actual design may use any number of shapes Note that, while the most common crystal orientation for Raman applications of KGW has been the "b-cut" crystal (the direction of laser propagation is along the crystal's b-axis or $N_p$ axis), a "c-cut" crystal (also called $N_g$) offers equal access to the 901 cm$^{-1}$ Raman Stokes shift and the same Raman gain but with less variation in the lensing properties in the resulting transverse plane. In some cases, the degree of astigmatism with the $N_g$ cut may be only about twelve percent of that for the $N_p$ cut. In any actual design, both of these two crystal orientations, as well as others, may be considered for use.

As can be seen here, one possible thermal advantage of the slab architecture for the Raman medium 604 is the localization of the strains in the outer regions 608 of the slab cross-section. Beam propagation may therefore be limited to the interior portion of the slab cross-section between the outer regions 608, which in some cases may account for approximately eighty percent or other large fraction of the total cross-sectional area. This large portion of the slab cross-section may be significantly or essentially free of any thermally-induced stresses, so this may be the portion of the Raman medium 604 that is used in a Raman laser.

Although FIG. 6 illustrates one example of a positioning of lenses 602 in a retro-lens assembly relative to a Raman medium 604, various changes may be made to FIG. 6. For example, any suitable number of lenses 602 may be used here. Also, the stresses in the Raman medium 604 may differ from those shown here depending on, among other things, the shape, material composition, and crystal orientation of the Raman medium 604.

Figure 7:
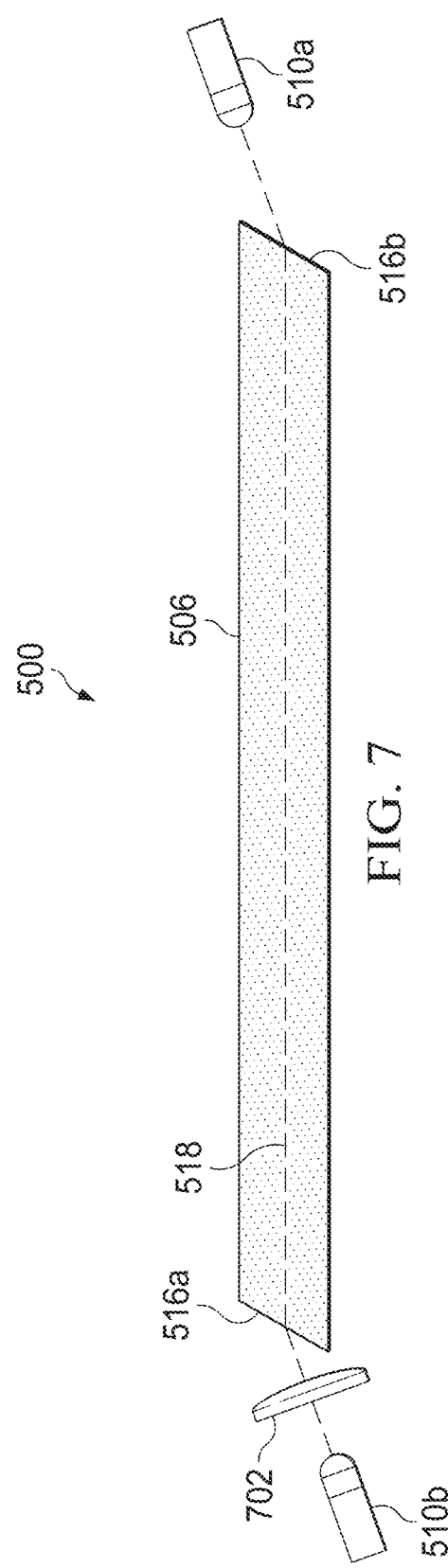
FIG. 7 illustrates an example compensation for thermal lensing in a compact Raman laser capable of efficient operation at low peak powers with good beam quality according to this disclosure.

FIG. 7 illustrates an example compensation for thermal lensing in a compact Raman laser capable of efficient operation at low peak powers with good beam quality according to this disclosure. For ease of explanation, it is assumed here that the compensation for thermal lensing is being used with the compact Raman laser 500 described above. However, the compensation for thermal lensing may be used in any other suitable compact Raman laser, including those described above.

As shown in FIG. 7, thermal lensing can be compensated by inserting an appropriate cylindrical lens 702 into the compact Raman laser 500, such as in the space between the Raman medium 506 and the retro-lens assembly 510b. In some cases, the cylindrical lens 702 may be implemented using a single lens having a fixed focal length equal and opposite to the developed thermal focal length resulting from the thermal lensing.

In other cases, the cylindrical lens 702 may be implemented using an adjustable compensation lens that includes two cylindrical lenses, where one cylindrical lens typically has a positive focal length and another cylindrical lens typically has a negative focal length (and may or may not have a different optical strength than the positive focal length lens). In these embodiments, the spacing between the two cylindrical lenses can be adjusted in order to vary the final resulting focal length to the point that it can essentially cancel out the thermal lensing. As a particular example, a feedback control system may be implemented to measure a residual thermal lensing and adjust the spacing between the two cylindrical lenses, thereby adjusting the effective focal length, to achieve highly precise compensation of the thermal lensing. In some embodiments, a dynamic lens-compensation (DLC) scheme for solid-state rod lasers may be readily adapted to the present geometry.

Although FIG. 7 illustrates one example of a compensation for thermal lensing in a compact Raman laser capable of efficient operation at low peak powers with good beam quality, various changes may be made to FIG. 7. For example, any other suitable mechanism may be used to compensate for thermal lensing in a compact Raman laser.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, it is important to recognize that alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one Raman medium configured to receive a pump beam at a first wavelength and shift at least a portion of the pump beam into a Stokes-shifted output beam at a second wavelength;
   a first lens configured to receive and focus the pump beam at the first wavelength into the at least one Raman medium; and
   first and second retro-lens assemblies positioned at opposite ends of the at least one Raman medium, each of the retro-lens assemblies comprising at least one prism configured to reflect beams from the at least one Raman medium back into the at least one Raman medium, each of the retro-lens assemblies also comprising multiple second lenses configured to control optical propagation of the beams entering and exiting the at least one Raman medium;
   wherein multiple pairs of lenses form multiple confocal arrangements of lenses, the pairs of lenses including the first lens and the second lenses of the retro-lens assemblies, the at least one Raman medium optically positioned between the lenses in the confocal arrangements of lenses.

2. The apparatus of claim 1, wherein the first and second retro-lens assemblies are configured to reflect the beams back into the at least one Raman medium so that the beams travel in parallel and anti-parallel paths in the at least one Raman medium.

3. The apparatus of claim 1, wherein:
   each confocal arrangement of lenses and a portion of the at least one Raman medium form a unit cell of a Raman laser; and
   multiple unit cells of the Raman laser use a common at least one Raman medium.

4. The apparatus of claim 1, wherein, in each of the retro-lens assemblies, the second lenses are attached to or form a part of the at least one prism.

5. The apparatus of claim 1, wherein, in each of the retro-lens assemblies, the second lenses are attached to or form a part of a support bar that is separate from the at least one prism.

6. The apparatus of claim 1, wherein:
   the at least one Raman medium comprises a first Raman medium and a second Raman medium;
   the apparatus further comprises an array of double-sided lenses optically positioned between the first and second Raman media; and
   each array of double-sided lenses comprises (i) third lenses forming part of multiple first confocal arrangements of lenses and (ii) fourth lenses forming part of multiple second confocal arrangements of lenses, the first Raman medium optically positioned between the lenses in each first confocal arrangement of lenses, the second Raman medium optically positioned between the lenses in each second confocal arrangement of lenses.

7. The apparatus of claim 1, wherein:
   the at least one Raman medium comprises faceted input and output faces; and
   the retro-lens assemblies are oriented obliquely with respect to the input and output faces so that reflections of optical energy from the at least one Raman medium are directed away from the retro-lens assemblies and optical paths of the pump beam and the Stokes-shifted output beam.

8. The apparatus of claim 1, wherein the second lenses of the retro-lens assemblies are positioned to receive or provide the beams to or from an inner portion of a cross-section of the at least one Raman medium, away from regions of stress birefringence at narrower ends of the cross-section of the at least one Raman medium.

9. The apparatus of claim 1, wherein the at least one Raman medium is configured to generate the Stokes-shifted output beam having a peak power of about ten kilowatts or less.

10. The apparatus of claim 1, further comprising:
    a pump source configured to generate the pump beam at the first wavelength.

11. A method comprising:
    focusing a pump beam at a first wavelength into at least one Raman medium using a first lens;
    shifting at least a portion of the pump beam at the first wavelength into a Stokes-shifted output beam at a second wavelength using the at least one Raman medium;
    using at least one prism of each of first and second retro-lens assemblies to reflect beams from the at least one Raman medium back into the at least one Raman medium; and
    using multiple second lenses of each of the first and second retro-lens assemblies to control optical propagation of the beams entering and exiting the at least one Raman medium;
    wherein multiple pairs of lenses form multiple confocal arrangements of lenses, the pairs of lenses including the first lens and the second lenses of the retro-lens assemblies, the at least one Raman medium optically positioned between the lenses in the confocal arrangements of lenses.

12. The method of claim 11, wherein the first and second retro-lens assemblies reflect the beams back into the at least one Raman medium so that the beams travel in parallel and anti-parallel paths in the at least one Raman medium.

13. The method of claim 11, wherein:
each confocal arrangement of lenses and a portion of the at least one Raman medium form a unit cell of a Raman laser; and
multiple unit cells of the Raman laser use a common at least one Raman medium.

14. The method of claim 11, wherein, in each of the retro-lens assemblies, the second lenses are attached to or form a part of the at least one prism.

15. The method of claim 11, wherein, in each of the retro-lens assemblies, the second lenses are attached to or form a part of a support bar that is separate from the at least one prism.

16. The method of claim 11, wherein:
the at least one Raman medium comprises a first Raman medium and a second Raman medium;
an array of double-sided lenses is optically positioned between the first and second Raman media; and
each array of double-sided lenses comprises (i) third lenses forming part of multiple first confocal arrangements of lenses and (ii) fourth lenses forming part of multiple second confocal arrangements of lenses, the first Raman medium optically positioned between the lenses in each first confocal arrangement of lenses, the second Raman medium optically positioned between the lenses in each second confocal arrangement of lenses.

17. The method of claim 11, wherein:
the at least one Raman medium comprises faceted input and output faces; and
the retro-lens assemblies are oriented obliquely with respect to the input and output faces so that reflections of optical energy from the at least one Raman medium are directed away from the retro-lens assemblies and optical paths of the pump beam and the Stokes-shifted output beam.

18. The method of claim 11, wherein the second lenses of the retro-lens assemblies are positioned to receive or provide the beams to or from an inner portion of a cross-section of the at least one Raman medium, away from regions of stress birefringence at narrower ends of the cross-section of the at least one Raman medium.

19. The method of claim 11, wherein the at least one Raman medium generates the Stokes-shifted output beam having a peak power of about ten kilowatts or less.

20. The method of claim 11, further comprising:
generating the pump beam at the first wavelength using a fiber laser.

* * * * *